H. A. MIEDREICH.
ADVERTISING STEREOPTICON.
APPLICATION FILED APR. 15, 1920.
1,361,274.
Patented Dec. 7, 1920.
2 SHEETS—SHEET 1.
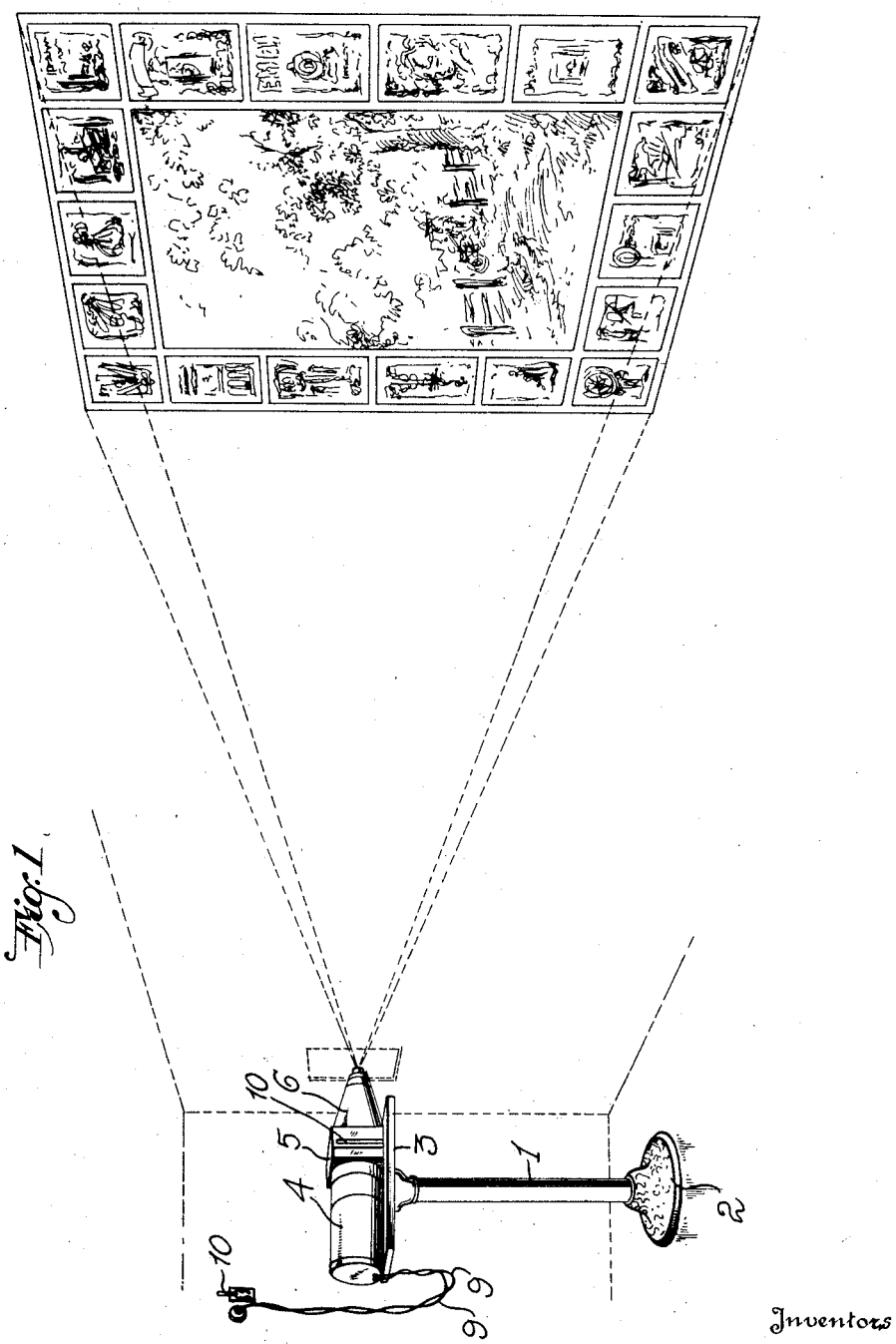

H. A. MIEDREICH.
ADVERTISING STEREOPTICON.
APPLICATION FILED APR. 15, 1920.
1,361,274.
Patented Dec. 7, 1920.
2 SHEETS—SHEET 2.
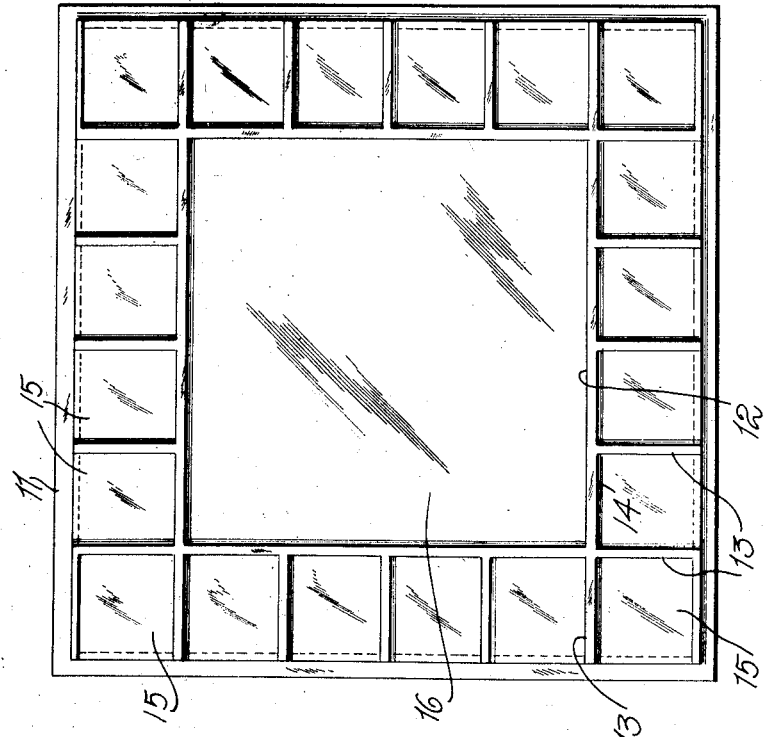
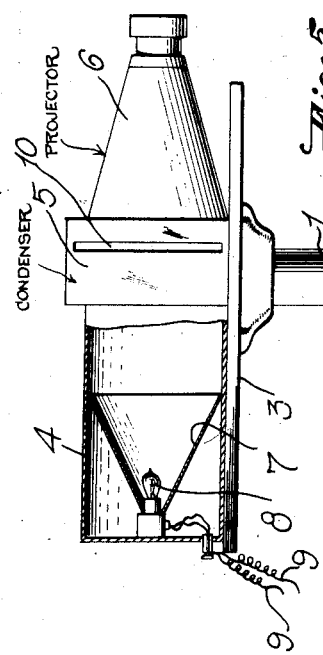
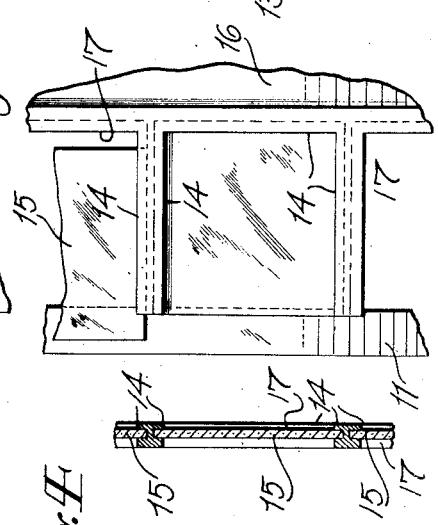
Inventors
Henry A. Miedreich
By Franklin N. Hash
Attorney

UNITED STATES PATENT OFFICE.

HENRY A. MIEDREICH, OF EVANSVILLE, INDIANA, ASSIGNOR OF ONE-HALF TO HERBERT W. BECKER, OF EVANSVILLE, INDIANA.

ADVERTISING-STEREOPTICON.

1,361,274.	Specification of Letters Patent.	Patented Dec. 7, 1920.

Application filed April 15, 1920. Serial No. 374,126.

*To all whom it may concern:*

Be it known that I, HENRY A. MIEDREICH, a citizen of the United States, residing at Evansville, in the county of Vanderburg and State of Indiana, have invented certain new and useful Improvements in Advertising-Stereopticons; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to provide an improved advertising device to be used in connection with motion picture apparatus; that is to say, the invention has for its object to provide a device to show advertising slides in motion picture theaters in conjunction with the moving pictures, the advertising slides forming a frame around the picture screen, and said slides being visible at all times without interfering in the least with the moving picture.

The accompanying drawings clearly disclose an exemplary construction capable of carrying out the underlying principles of the invention. Like reference characters designate corresponding parts throughout the several views. Briefly described:

Figure 1 is a perspective view of the device, constituting the invention,

Fig. 2 is a view in side elevation, partly in section, of the device, the supporting pedestal being broken away, Fig. 3 is a view in front elevation of the carrier and the advertising slides carried thereby, Fig. 4 is a fragmentary sectional view of said carrier and slides, and Fig. 5 is a fragmentary view in front elevation of said carrier and slides, one of the latter being shown partly withdrawn from the carrier.

Referring now in detail to the drawings:

1 designates a pedestal provided with a suitable base 2, adapted to rest upon the floor of a motion picture theater, or the like.

Supported by the pedestal 1 is a shelf, or table, 3, upon which are disposed a cylinder, or drum, 4, a condenser 5 and a projector 6.

In the cylinder 4 is a conical reflector 7, at the apex of which is an electric light bulb 8, to the filaments of which lead electrical conductors 9, 9 of an electrical circuit in which is a switch 10.

The condenser 5 may be of ordinary construction, provided with a set of condensing lenses which collect the light rays, lighting up the plate, or carrier, holding the advertising slides. The condenser casing is provided at its sides with a slot 10, in which my carrier 11 may be slid.

As shown in Fig. 3, the carrier 11 is a plate preferably constructed of lead and, in the form shown, is rectangular and provided with a rectangular beading 12, and with beadings 13 extending from said square beading 12. The beading 12, at its top, is provided with a marginal outward projecting flange 14 and each of the beadings 13 is provided at its top with flanges 14, 14. Said flanges constitute overhanging ledges under which transparent advertising panels 15 may be slid, and frictionally held thereby against accidental displacement. These slides 15 bear suitable advertising matter, adapted to be projected as a border to the motion picture being displayed upon the screen.

The portion 16 of the tin plate bounded by the rectangular beading 12 is imperforate, while the portions of the plate exterior to said central portion 16, and comprised within the extensions 13, 13, are apertured as shown at 17, which apertures are closed by the advertising slides 15 when the latter are in position in the carrier.

It will be apparent from the above description that the device of my invention is not an attachment to the ordinary motion picture apparatus and that the device may be placed anywhere that is most convenient. The central portion 16 covers the motion picture screen so that the pictures being shown thereon are not interfered with by the operation of the device of my invention. It will be understood that the carrier, or lead plate, 11 is very small and that the slides 15 are miniature slides, being preferably only ½ inch in length.

Having thus fully described my invention, what I claim to be new is:

1. The combination, with a stereopticon, including a condenser casing provided with slots in the sides thereof, of an opaque plate adapted to be slid into said condenser casing through said slots, and comprising a central imperforate portion, and provided with openings around said imperforate portion, transparent advertising slides, adapted to cover said openings, and means for holding said slides in position against accidental displacement.

2. The combination, with a stereopticon, including a condenser casing provided with slots in the sides thereof, of an opaque plate adapted to be slid into said condenser casing through said slots, and comprising a central imperforate portion and provided with openings around said imperforate portion, transparent advertising slides, adapted to cover said openings, and means carried by said opaque member for retaining said slides in position against accidental displacement.

3. The combination, with a stereopticon, including a condenser casing provided with slots in the sides thereof, of an opaque plate adapted to be slid into said condenser casing through said slots, and comprising a central imperforate portion, and provided with openings around said imperforate portion, transparent advertising slides, adapted to cover said openings, and overhanging flanges carried by said opaque member and bounding three sides of each of said openings for retaining said slides in position against accidental displacement.

4. In motion picture apparatus, the combination of a cylinder, a reflector therewithin, an electric light bulb within said reflector, a condenser casing at one end of said cylinder and provided with slots in the sides thereof, a projector communicating with said condenser and an opaque member adapted to be slid into said condenser casing through said slots, and provided with a central imperforate portion and with apertures around said imperforate portion, and transparent advertising slides covering said apertures.

In testimony whereof I hereunto affix my signature.

HENRY A. MIEDREICH.